US012767151B2

(12) United States Patent
Hwang

(10) Patent No.: US 12,767,151 B2
(45) Date of Patent: Oct. 20, 2026

(54) METHOD AND APPARATUS FOR CONTROLLING VEHICLE BASED ON WHEEL TORQUE PREDICTION

(71) Applicant: HYUNDAI MOBIS CO., LTD., Seoul (KR)

(72) Inventor: Woo Hyun Hwang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 19/206,668

(22) Filed: May 13, 2025

(65) Prior Publication Data

US 2026/0200477 A1 Jul. 16, 2026

(30) Foreign Application Priority Data

Jan. 16, 2025 (KR) ........................ 10-2025-0006873

(51) Int. Cl.
*B60W 40/12* (2012.01)
*B60W 50/00* (2006.01)

(52) U.S. Cl.
CPC ........ *B60W 50/0097* (2013.01); *B60W 40/12* (2013.01); *B60W 2510/0657* (2013.01); *B60W 2520/105* (2013.01); *B60W 2520/28* (2013.01); *B60W 2520/30* (2013.01)

(58) Field of Classification Search
CPC ............. B60W 50/0097; B60W 40/12; B60W 2510/0657; B60W 2520/105; B60W 2520/28; B60W 2520/30
USPC ........................................................ 701/32.1
See application file for complete search history.

(56) References Cited

U.S. PATENT DOCUMENTS

2019/0375421 A1 12/2019 Asher et al.
2022/0289287 A1* 9/2022 Van Ende .............. G06N 20/00
2023/0055066 A1 2/2023 Asadi et al.
2024/0116367 A1 4/2024 Nguyen et al.

FOREIGN PATENT DOCUMENTS

CN 112758097 A * 5/2021 ............ B60W 40/10
CN 119128412 A * 12/2024 ............. G06N 3/082
GB 2552011 A 10/2018

OTHER PUBLICATIONS

English translation of CN112758097. (Year: 2021).*
English translation of CN119128412. (Year: 2024).*

* cited by examiner

*Primary Examiner* — Tiffany P Young
(74) *Attorney, Agent, or Firm* — NovoTechIP International PLLC

(57) ABSTRACT

A method and an apparatus for controlling a vehicle based on wheel torque prediction are disclosed. According to aspects of the present disclosure, a method for controlling a vehicle based on wheel torque prediction is provided, the method including: a collecting sensor data indicating a driving state of the vehicle; generating prediction data for a wheel torque of the vehicle based on the sensor data using a first model, wherein the first model is a model based on a physical equation and a recursive equation; generating correction data for the wheel torque of the vehicle based on the sensor data using a second model, wherein the second model is a machine learning model; determining final prediction data for the wheel torque of the vehicle based on one or more of the prediction data and the correction data; and controlling the vehicle based on the final prediction data.

20 Claims, 6 Drawing Sheets

METHOD AND APPARATUS FOR CONTROLLING VEHICLE BASED ON WHEEL TORQUE PREDICTION

CROSS-REFERENCE TO RELATED APPLICATIONS

This application claims priority to and benefit of Korean Patent Application No. 10-2025-0006873, filed on Jan. 16, 2025, the entire disclosure of which is incorporated herein by reference for all purposes.

TECHNICAL FIELD

The present disclosure relates to a method and an apparatus for controlling a vehicle based on wheel torque prediction.

BACKGROUND

The statements in this section merely provide background information related to the present disclosure and do not necessarily constitute prior art.

Techniques for accurately predicting wheel torque for stable driving and control of a vehicle are emerging. Conventional wheel torque prediction methods and apparatuses based on physical models operate relatively accurately in stable driving environments in a manner that calculates wheel torque based on sensor data of the vehicle and utilizes the wheel torque for control. However, such a model has a limitation in that a wheel torque prediction error becomes large in a non-linear driving section such as sudden braking, high-speed cornering, and tire wear. This is because the physical model does not fully reflect the various non-linear factors and noise that occur in complex driving environments.

In particular, the existing technology does not consider the variability of the real-time data according to the road condition, the state change of the vehicle, the environmental noise, etc., resulting in a decrease in the accuracy and stability of the vehicle control.

Therefore, there is a need for a method and an apparatus that is capable of predicting wheel torque with high accuracy and utilizing the wheel torque for vehicle control even in complex road conditions and various driving environments.

SUMMARY

The main object of the present disclosure is to accurately predict wheel torque and improve stability and accuracy of the vehicle control based thereon. Specifically, the main objective is to provide a method and an apparatus that is capable of predicting wheel torque optimized for driving conditions that change in real time by using a machine learning model and introducing a dynamic threshold, and performing vehicle control based thereon.

The technical objects of the present disclosure are not limited to those described above, and other technical objects not mentioned above may be understood clearly by those skilled in the art from the descriptions given below.

An embodiment of the present disclosure provides a method for controlling a vehicle based on wheel torque prediction, the method comprising: collecting sensor data indicating a driving state of the vehicle; generating prediction data for wheel torque of the vehicle based on the sensor data using a first model, wherein the first model is based on a physical equation and a recursive equation; generating correction data for the wheel torque of the vehicle based on the sensor data using a second model, wherein the second model is a machine learning model; determining final prediction data for the wheel torque of the vehicle based on one or more of the prediction data and the correction data; and controlling the vehicle based on the final prediction data.

Another embodiment of the present disclosure provides an apparatus for controlling a vehicle based on wheel torque prediction, the apparatus comprising: at least one memory for storing instructions; and at least one processor, wherein the at least one processor is configured to execute the instructions to perform processes of: collecting sensor data indicating a driving state of the vehicle; generating prediction data for wheel torque of the vehicle based on the sensor data using a first model, wherein the first model is based on a physical equation and a recursive equation; generating correction data for the wheel torque of the vehicle based on the sensor data using a second model, wherein the second model is a machine learning model; determining final prediction data for the wheel torque of the vehicle based on one or more of the prediction data and the correction data; and controlling the vehicle based on the final prediction data.

According to an embodiment of the present disclosure, the stability and accuracy of vehicle control may be improved by controlling the vehicle based on the final prediction data determined based on the machine learning model and the dynamic threshold.

According to an embodiment of the present disclosure, the accuracy of prediction may be improved by replacing or correcting the prediction value of the wheel torque of the existing physical model based on the prediction value of wheel torque of the machine learning model.

According to an embodiment of the present disclosure, an optimized wheel torque may be predicted by dynamically adjusting a threshold and adapting to changing road conditions and vehicle conditions in real time.

The technical effects of the present disclosure are not limited to the technical effects described above, and other technical effects not mentioned herein may be understood to those skilled in the art to which the present disclosure belongs from the description below.

DETAILED DESCRIPTION

Figure 1:
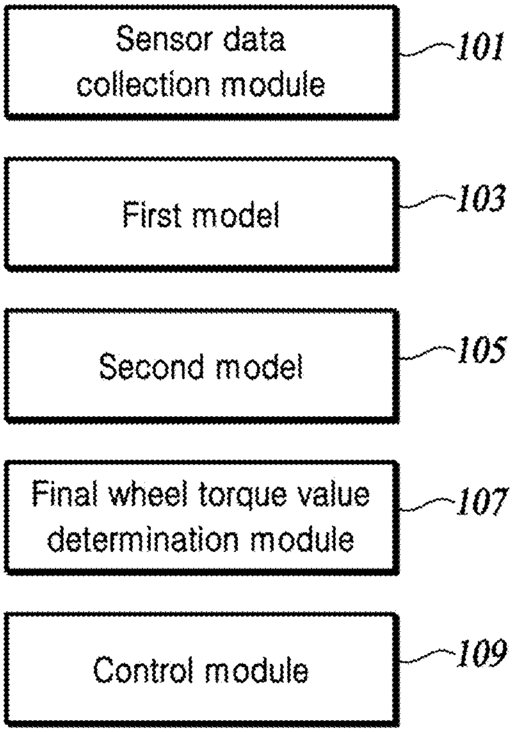
FIG. 1 is a block diagram schematically illustrating components of an apparatus for controlling a vehicle based on wheel torque prediction according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present invention, and is not intended to represent the only embodiments in which the present invention may be practiced.

FIG. 1 is a block diagram schematically illustrating components of an apparatus for controlling a vehicle based on wheel torque prediction according to an embodiment of the present disclosure.

Referring to FIG. 1, an apparatus for controlling a vehicle based on wheel torque prediction (hereinafter referred to as "a vehicle control apparatus") may include a sensor data collection module 101, a first model 103, a second model 105, a final wheel torque value determination module 107, and a control module 109. The vehicle control apparatus may be implemented using some or all of one or more computing devices 60.

The sensor data collection module 101 may obtain measured sensor data using one or more sensors attached to the vehicle. The sensor data may include one or more of wheel angular velocity, vehicle acceleration, and engine torque. The sensor data collection module 101 may be implemented using some or all of the one or more computing devices 60.

The first model 103 and the second model 105 may be models for predicting wheel torque. The first model 103 may be a model based on a physical equation and a recursive equation. The wheel torque predicted by the first model 103 may be referred to as "prediction data" 203 in the present disclosure. The first model 103 may be implemented using some or all of the one or more computing devices 60.

The first model 103 may predict the wheel torque based on the physical equation and update the predicted wheel torque based on the recursive equation. The process of updating the predicted wheel torque based on the recursive equation may be a process of removing noise in order to more accurately predict the wheel torque. The recursive equation may be a Kalman filter.

$$T_{wheel} = I_{wheel} \cdot \alpha_{wheel} + f_{external} \quad \text{[Equation 1]}$$

Equation 1 indicates an example of a physical equation. $T_{wheel}$ is the wheel torque and the unit is N·m. $I_{wheel}$ is the rotational inertia of the wheel and the unit is kg·m$^2$. $\alpha_{wheel}$ is the angular acceleration of the wheel and the unit is rad/s$^2$. The $f_{external}$ is an external resistance. The external resistance may be, for example, a road resistance or an air resistance.

$$\hat{T}_{wheel}^{(k+1|k)} = A_T \cdot \hat{T}_{wheel}^{(k)} + B_T \cdot u^{(k)} \quad \text{[Equation 2]}$$

Equation 2 indicates an example of a recursive equation.

$$\hat{T}_{wheel}^{(k+1|k)}$$

is the k+1-th wheel torque prediction value.

$$\hat{T}_{wheel}^{(k)}$$

is the k-th wheel torque prediction value. The k+1-th wheel torque prediction value may be a value obtained by updating the k-th wheel torque prediction value based on the Kalman filter.

$$\hat{T}_{wheel}^{(k)}$$

may be $T_{wheel}$ at a specific time point. $A_T$ is a state transition matrix. BT is a control input matrix. $u^{(k)}$ may be a control input.

For example, the first model 103 may obtain the rotational inertia of the wheel, the angular acceleration of the wheel, and the external resistance at a specific time point, and predict the wheel torque at the corresponding time point based on Equation 1. The rotational inertia of the wheel, the angular acceleration of the wheel, and the external resistance may be included in the sensor data or calculated from the sensor data. Then, the first model 103 may predict the wheel torque at the next time point based on the predicted wheel torque.

The second model 105 may be a machine learning model. That is, the second model 105 may be a model that has been pre-trained using a machine learning technique. The second model 105 may be a model that predicts the wheel torque based on the input data. The wheel torque predicted by the second model 105 in an inference phase may be referred to herein as "correction data" 205. The second model 105 may be implemented using some or all of the one or more computing devices 60.

A training module (not shown) separate from the second model 105 may be used for pre-training of the second model 105. The training module may fit the second model 105 to a training dataset. The training module may train the second model 105, so that the second model 105 corrects the wheel torque prediction error. For example, the training module may input the input data to the second model 105, and calculate the loss based on the wheel torque output by the second model 105 and the Ground Truth (GT) wheel torque mapped (or labeled) to the input data. The input data and the GT wheel torque may be included in the test data 305. In other words, the test data 305 may include the training dataset. For example, the input data may include wheel angular velocity 401, vehicle acceleration 403, and engine torque 405. For example, the GT wheel torque may be measured data 407 for the wheel torque of the vehicle. The wheel torque output by the second model 105 may be the prediction data (not shown) for the wheel torque of the vehicle. Detailed description of the test data 305 will be described below with reference to FIGS. 3 and 4. As an index for calculating the loss, Mean Square Error (MSE) may be used, but is not limited thereto. The training module may update the parameters of the second model 105 in a direction in which losses are minimized. For example, the training module may update weights of layers (or nodes) included in the second model 105 based on a backpropagation algorithm. Meanwhile, although the term test data 305 is used in the present disclosure, it is for convenience of description and may have a different meaning from a test data set in the field of artificial intelligence technology.

The final wheel torque value determination module 107 may calculate a difference between the prediction data 203, which is generated by using the first model 103, and the measured data 407 for the wheel torque of the vehicle included in the test data 305. The final wheel torque value determination module 107 may determine the correction data 205 generated by using the second model 105 as the final prediction data 207 based on the difference or may determine a value obtained by adding the correction data 207 to the prediction data 203 as the final prediction data 207. More specifically, the final wheel torque value determination module 107 may compare the difference with the threshold, and determine the correction data 205 as the final prediction data 207 when the difference is greater than the threshold. When the difference is less than or equal to the threshold value, the final wheel torque value determination module 107 may determine the value obtained by adding the correction data 205 to the prediction data 203 as the final prediction data 207. The final wheel torque value determination module 107 may be implemented using some or all of the one or more computing devices 60.

The threshold may be a dynamic threshold. That is, the threshold is set based on a preset threshold, but may be dynamically adjusted based on the driving condition of the vehicle. The preset threshold may be called an initial threshold.

The initial threshold may be set based on pre-collected test data 305. The initial threshold may be set based on a mean and standard deviation of the error distribution. The error may mean a difference between the measured data 407 and the prediction data 427 of the wheel torque of the vehicle with respect to data collected at a specific time point among a plurality of data included in the test data 305. The error distribution may mean that an error for each of a plurality of data collected at different time points is represented by a distribution. That is, the vehicle control apparatus may generate an error distribution by repeatedly performing a process of calculating a difference between the measured data 407 and the prediction data 427, both included in the test data 305, with respect to a plurality of data collected at different time points.

$$e_{threshold} = \mu + 2\sigma \quad \text{[Equation 3]}$$

Equation 3 indicates an example of an initial threshold. $e_{threshold}$ is an initial threshold. μ is the mean of the error distribution. σ is the standard deviation of the error distribution. The initial threshold may be set equal to the mean of the error distribution plus two times the standard deviation of the error distribution.

The dynamic threshold may be set based on data during driving. That is, the vehicle control apparatus may continuously collect data during driving, calculate an error based on the collected data, and adjust the initial threshold based on the calculated error.

$$e_{threshold}^{dynamic} = f(e_{history}, \Delta t) \quad \text{[Equation 4]}$$

Equation 4 indicates an example of a dynamic threshold.

$$e_{threshold}^{dynamic}$$

is a dynamic threshold. $e_{history}$ is a history of error values generated during past driving. Δt is a threshold adjustment value according to the driving time.

The control module 109 may control the vehicle based on the prediction value of the wheel torque. The prediction value of the wheel torque may be the final prediction data 207. The control module 109 may optimize the acceleration, braking, steering, etc. of the vehicle to suit the driving conditions of the vehicle based on the prediction value of the wheel torque. The prediction value of the wheel torque may be the final prediction data 207. For example, the control module 109 may be an electronic control unit (ECU) of the vehicle. The control module 109 may be implemented using some or all of the one or more computing devices 60. As such, the vehicle control apparatus according to an embodiment of the present disclosure may control the vehicle based on the final prediction data determined based on the machine learning model and the dynamic threshold, thereby improving stability and accuracy of vehicle control.

Figure 2:
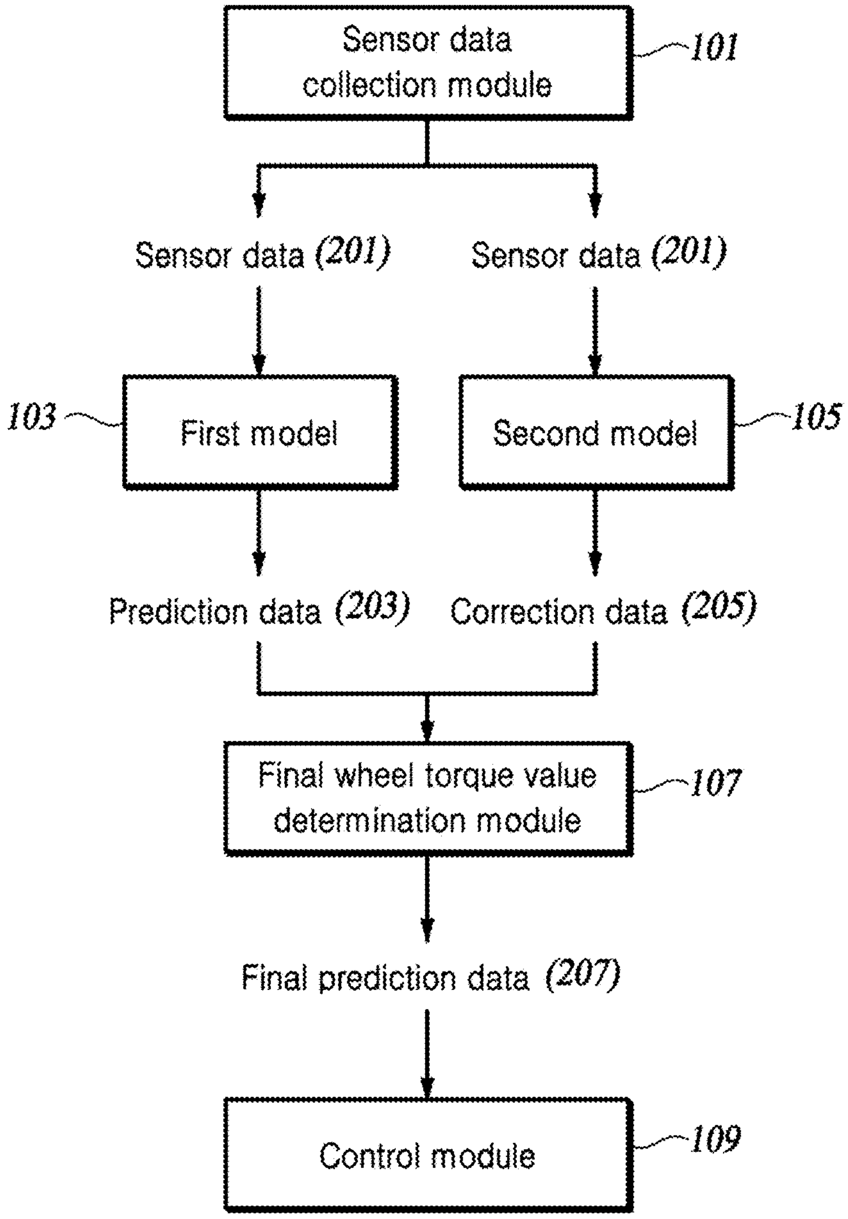
FIG. 2 is a diagram schematically showing a data flow between components included in an apparatus for controlling a vehicle based on wheel torque prediction according to an embodiment of the present disclosure to schematically describe an operation of the apparatus.

FIG. 2 is a diagram schematically showing a data flow between components included in an apparatus for controlling a vehicle based on wheel torque prediction according to an embodiment of the present disclosure to schematically describe an operation of the apparatus.

Referring to FIG. 2, the sensor data collection module 101 may transfer the sensor data 201 to the first model 103 and the second model 105. The sensor data 201 may include one or more of wheel angular velocity, vehicle acceleration, and engine torque. The sensor data 201 may be data collected during driving of the vehicle. That is, the sensor data 201 may refer to data collected in an inference step of the second model 105.

The first model 103 may obtain the sensor data 201. In other words, the sensor data 201 may be input to the first model 103. The first model 103 may predict and update the wheel torque based on the input sensor data 201. As a result, the first model 103 may generate prediction data 203. In other words, the first model 103 may output the prediction data 203. The prediction data 203 may refer to the prediction value of the wheel torque. The first model 103 may transfer the prediction data 203 to the final wheel torque value determination module 107.

The second model 105 may obtain the sensor data 201. In other words, the sensor data 201 may be input to the second model 105. The second model 105 may predict the wheel torque based on the input sensor data 201. As a result, the second model 105 may generate the correction data 205. In other words, the second model 105 may output the correction data 205. The correction data 205 may refer to the prediction value of the wheel torque. The second model 105 may transfer the correction data 205 to the final wheel torque value determination module 107.

The final wheel torque value determination module 107 may obtain the prediction data 203 and the correction data 205. The final wheel torque value determination module 107 may calculate a difference between the prediction data 203 and the measured data 407. The final wheel torque value determination module 107 may obtain the measured data 407 from the test data 305. The final wheel torque value determination module 107 may compare the difference between the prediction data 203 and the measured data 407 with the threshold, determine the correction data 205 as the final prediction data 207 when the difference is greater than the threshold, and determine a value obtained by adding the correction data 205 to the prediction data 203 as the final prediction data 207 when the difference is less than or equal to the threshold. The final wheel torque value determination module 107 may transfer the final prediction data 207 to the control module 109.

That is, the vehicle control apparatus may first temporarily determine the prediction data 203 generated by using the first model 103 based on the physical equation and the recursive equation as the prediction value of the wheel torque, then compare the difference between the prediction data 203 and the measured data 407 with the threshold, and based on the compared result, secondarily, i) when the difference is greater than the threshold, finally determine the correction data 205 as the prediction value for the wheel torque, and ii) when the difference is less than or equal to the threshold, then finally determine a value obtained by adding the correction data 205 to the prediction data 203 as the prediction value. The process of finally determining the correction data 205 as the prediction value for the wheel torque according to the difference being greater than the threshold may be understood as replacing the prediction data 203 of the first model 103 with the correction data 205 of the second model 105 in relation to the prediction value for the wheel torque. The process of finally determining a value obtained by adding the correction data 205 to the prediction data 203 as the prediction value of the wheel torque according to the difference being less than or equal to the threshold may be understood as supplementing or correcting the prediction data 203 of the first model 103 with the correction data 205 in relation to the prediction value of the wheel torque. As described above, the vehicle control apparatus according to an embodiment of the present disclosure may replace or correct the prediction value of the wheel torque of the existing physical model based on the prediction value of the wheel torque of the machine learning model, thereby improving the accuracy of prediction.

The threshold may be a dynamic threshold. The final wheel torque value determination module 107 may obtain the threshold. The vehicle control apparatus may set the threshold value to an initial threshold generated based on the test data 305 obtained in pre-driving, and dynamically adjust the threshold based on the driving condition of the vehicle in actual driving. As such, the vehicle control apparatus according to an embodiment of the present disclosure may dynamically adjust the threshold to adapt to changing road conditions or vehicle conditions in real time, thereby predicting the optimized wheel torque.

The control module 109 may obtain the final prediction data 207. The control module 109 may control the vehicle based on the final prediction data 207. Control of the vehicle may include one or more of acceleration, braking, and steering.

Figure 3:
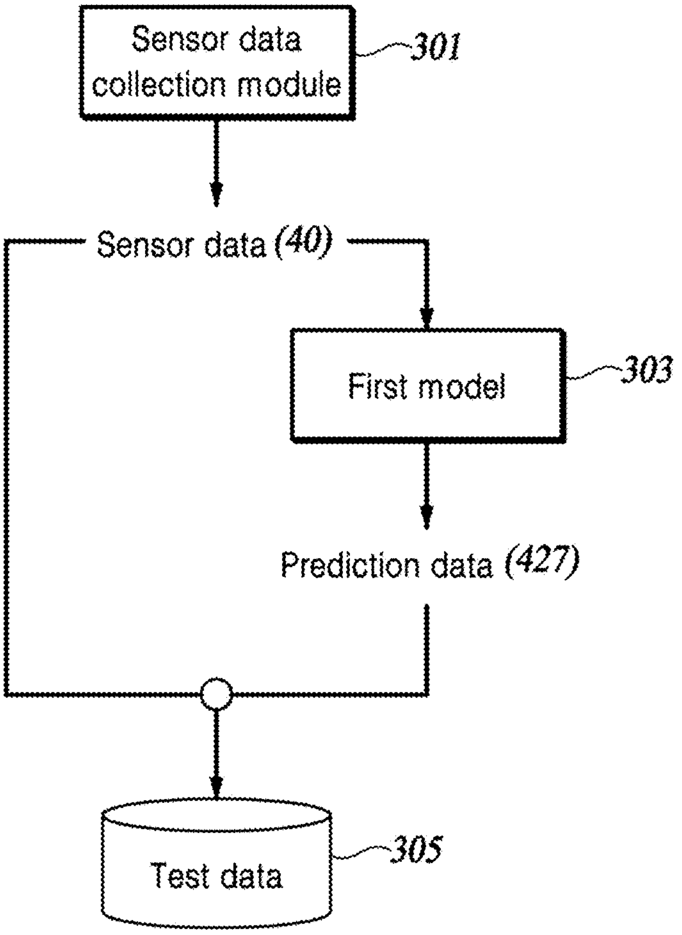
FIG. 3 is a diagram for describing a process of building test data according to an embodiment of the present disclosure.

FIG. 3 is a diagram for describing a process of building test data according to an embodiment of the present disclosure.

Figure 4:
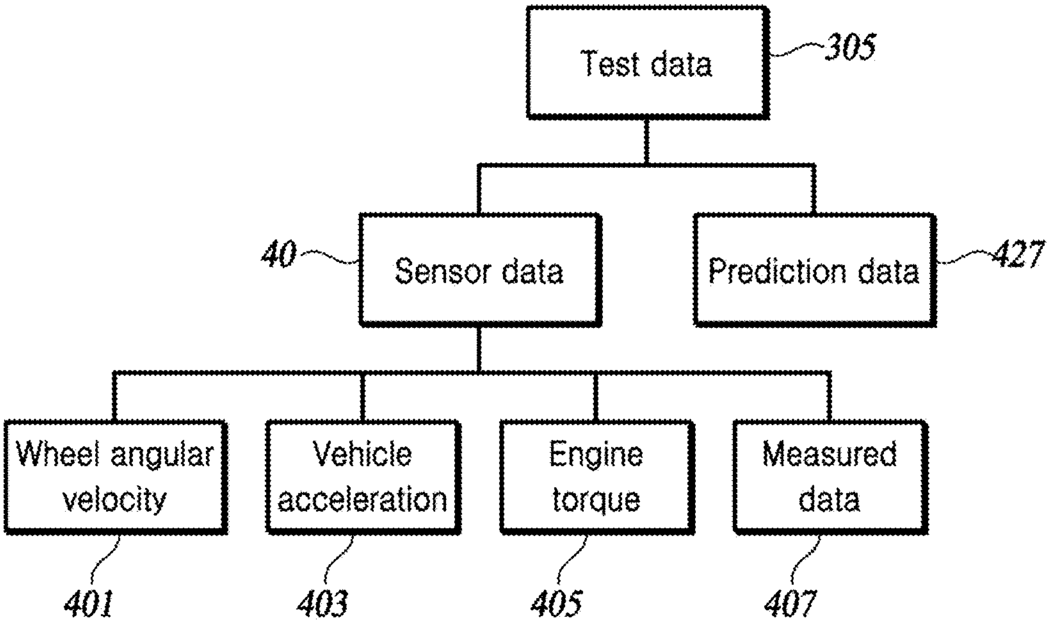
FIG. 4 is a diagram for describing types of data included in the test data according to an embodiment of the present disclosure.

FIG. 4 is a diagram for describing types of data included in the test data according to an embodiment of the present disclosure.

It is assumed that one or more processes described with reference to FIGS. 3 and 4 in the present disclosure are processes performed prior to the training phase of the second model 105. This is in contrast to assuming that one or more processes described with reference to FIG. 2 are processes performed in the inference phase of the second model 105. To avoid confusion, a sensor data collection module 301, a first model 303, sensor data 40, and prediction data 427 referred to by one or more of FIG. 3 and FIG. 4 will be described below by using different symbols from the sensor data collection device 101, the first model 103, the sensor data 201, and the prediction data 203 referred to by FIG. 2.

For example, FIG. 2 may be a diagram that assumes the driving situation of the vehicle at a specific time point, and FIGS. 3 and 4 may be diagrams that assume driving situations of the vehicle before a specific time point. The driving situation of the vehicle before the specific time point may be referred to as a pre-driving situation of the vehicle. The driving situation of the vehicle at the specific time point and the driving situation of the vehicles before the specific time point may differ according to the presence or absence of the measured value of the wheel torque, i.e., measured data 407 for the wheel torque.

Referring to FIGS. 3 and 4, the sensor data collection module 301 may obtain measured sensor data 40 using one or more sensors attached to the vehicle. The sensor data 40 may include one or more of wheel angular velocity, vehicle acceleration, and engine torque. That is, the sensor data 40 may include one or more of wheel angular velocity 401, vehicle acceleration 403, and engine torque 405. The sensor data 40 may further include a measured value of the wheel torque. That is, the sensor data 40 may further include measured data 407.

The first model 303 may obtain the sensor data 40. The first model 303 may predict the wheel torque based on the sensor data 40. That is, the first model 303 may generate prediction data 427 based on the sensor data 40.

The vehicle control apparatus may store the sensor data 40 and the prediction data 427 as test data 305.

Referring to FIG. 4, the test data 305 may include the sensor data 40 and the prediction data 427. The sensor data 40 and the prediction data 427 may be data obtained prior to the training phase of the second model 105. The sensor data 40 may be utilized as a training dataset of the second model 105. For example, the training module may input one or more of the wheel angular velocity 401, the vehicle acceleration 403, and the engine torque 405 to the second model 105, compare the prediction value of the wheel torque output by the second model 105 with the measured value of the wheel torque to calculate a loss, and update a weight of the second model 105 in a direction in which the loss is minimized. The measured value of the wheel torque may be the measured data 407. That is, the measured data 407 may be the GT wheel torque mapped to the input data of the second model 105.

Meanwhile, the prediction value of the wheel torque output by the first model 303, that is, the prediction data 427, may be used for initial threshold setting. The vehicle control apparatus may compare the measured data 407 and the prediction data 427 to calculate the difference, and set an initial threshold based on an error distribution generated based on the difference.

In terms of data obtained during pre-driving of the vehicle, the test data 305 may be referred to as "field data." In particular, the sensor data 40 include values measured during the pre-driving of the vehicle so that the expression "field data" will be clearly understood by a person skilled in the art.

Figure 5:
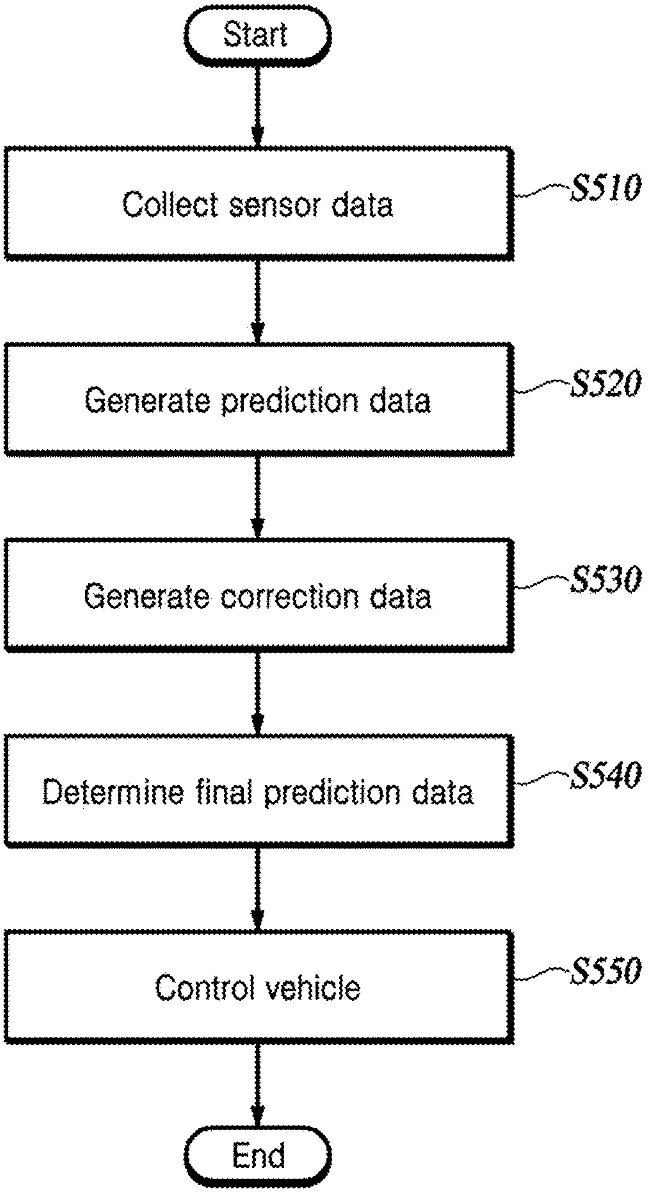
FIG. 5 is a flowchart schematically illustrating a method for controlling a vehicle based on wheel torque prediction according to an embodiment of the present disclosure.

FIG. 5 is a flowchart schematically illustrating a method for controlling a vehicle based on wheel torque prediction according to an embodiment of the present disclosure.

Referring to FIG. 5, the vehicle control apparatus may collect sensor data (S510). The sensor data may include one or more of wheel angular velocity, vehicle acceleration, and engine torque.

The vehicle control apparatus may generate prediction data by using a first model that is a model based on a physical equation and a recursive equation (S520). The prediction data may be a prediction value for the wheel torque of the vehicle. A process of generating the prediction data using the first model may include a process of predicting a wheel torque value based on the physical equation and a process of updating the predicted wheel torque value based on the recursive equation.

The vehicle control apparatus may generate correction data by using a second model which is a machine learning model (S530). The correction data may be the prediction value for the wheel torque of the vehicle. The second model may be a pretrained model based on the test data.

The vehicle control apparatus may determine final prediction data based on one or more of the prediction data and the correction data (S540). The vehicle control apparatus may calculate a difference between the prediction data and the measured data, which is included in the test data, compare the difference with a threshold, and based on the compared result, determine (a) the correction data or (b) a value obtained by adding the correction data to the prediction data as the final prediction data. The threshold may be a dynamic threshold that is set to an initial threshold but that changes based on the driving condition of the vehicle. The initial threshold may be set based on an error distribution generated based on an error between the prediction data and the measured data in the test data. The prediction data 203, which is not included in the test data, and the prediction data 427, which is included in the test data, are terms on the premise of being before the inference phase and the training phase of the second model 105, respectively, and may be clearly distinguished from the viewpoint of a person skilled in the art.

The vehicle control apparatus may control the vehicle based on the final prediction data (S550). The control may include one or more of acceleration, braking, and steering.

Figure 6:
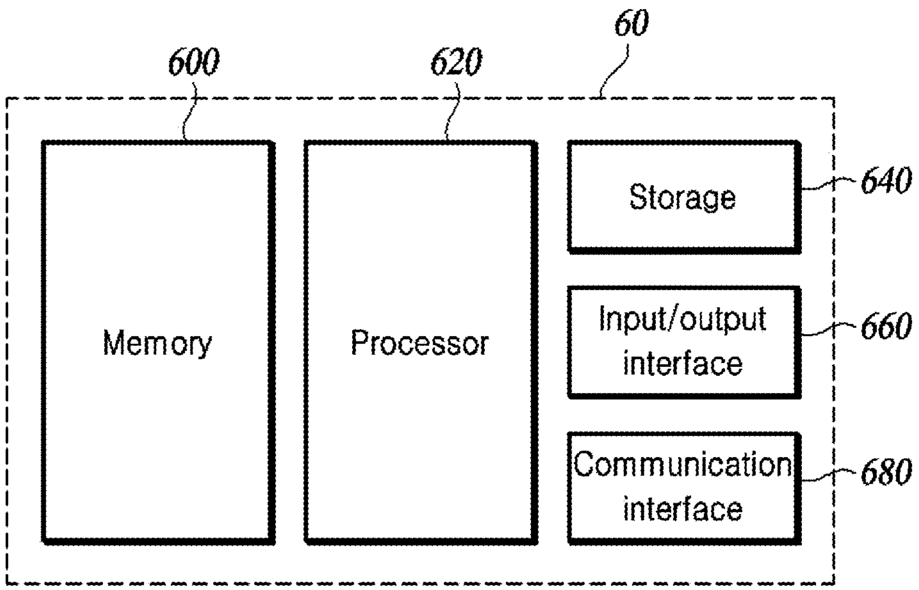
FIG. 6 is a block diagram schematically illustrating an exemplary computing device that may be used to implement a method or an apparatus described in the present disclosure.

FIG. 6 is a block diagram schematically illustrating an exemplary computing device that may be used to implement a method or an apparatus described in the present disclosure.

The computing device 60 may include all or part of a memory 600, a processor 620, a storage 640, an input/output interface 660, and a communication interface 680. The computing device 60 may be a stationary computing device, such as a desktop computer or a server, or a mobile computing device, such as a laptop computer or a smart phone. The computing device 60 may include a specialized hardware accelerator capable of processing operations of an artificial intelligence model in an efficient manner. For example, the computing device 60 may include a graphic processing unit (GPU), a tensor processing unit (TPU), or a neural processing unit (NPU).

The memory 600 may store a program that enables the processor 620 to perform methods or operations according to various embodiments of the present disclosure. For example, a program may include a plurality of instructions executable by the processor 620, and the methods or operations described above may be performed by executing the plurality of instructions by the processor 620. The memory 500 may consist of a single memory or a plurality of memories. In this case, information required to perform the methods or operation according to various embodiments of the present disclosure may be stored in a single memory or distributed across a plurality of memories. When the memory 600 is composed of a plurality of memories, the plurality of memories may be physically separated. The memory 600 may include at least one of volatile memory and non-volatile memory. Volatile memory includes Static Random Access Memory (SRAM) or Dynamic Random Access Memory (DRAM), while non-volatile memory includes flash memory.

The processor 620 may include at least one core capable of executing at least one instruction. The processor 620 may execute instructions stored in the memory 600. The processor 620 may consist of a single processor or a plurality of processors.

The storage 640 maintains stored data even if power supplied to the computing device 60 is cut off. For example, the storage 640 may include non-volatile memory or may include a storage medium such as a magnetic tape, an optical disk, or a magnetic disk. A program stored in the storage 640 may be loaded into the memory 600 before being executed by the processor 620. The storage 640 may store files written in a program language, and a program created from the files by a compiler may be loaded into the memory 600. The storage 640 may store data to be processed by the processor 620 and/or data processed by the processor 620.

The input/output interface 660 may provide an interface with an input device such as a keyboard or a mouse and/or an output device such as a display device or a printer. The user may trigger execution of a program by the processor 620 through the input device and/or check the processing results of the processor 620 through the output device.

The communication interface 680 may provide access to an external network. The computing device 60 may communicate with other devices through the communication interface 680.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in this specification as being sequentially performed, this is merely an exemplary description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A method for controlling a vehicle based on wheel torque prediction, the method comprising:

collecting sensor data indicating a driving state of the vehicle;

generating prediction data for wheel torque of the vehicle based on the sensor data using a first model, wherein the first model is based on a physical equation and a recursive equation;

generating correction data for the wheel torque of the vehicle based on the sensor data using a second model, wherein the second model is a machine learning model;

determining final prediction data for the wheel torque of the vehicle based on one or more of the prediction data and the correction data; and controlling the vehicle based on the final prediction data.

2. The method of claim 1, further comprising:

calculating a difference between the prediction data and measured data of the wheel torque of the vehicle in pre-collected test data, and wherein determining the final prediction data comprises one of, based on the calculated difference, (a) determining the correction data as the final prediction data, or (b) determining a value obtained by adding the correction data to the prediction data as the final prediction data.

3. The method of claim 2, wherein determining the final prediction data comprises determining the correction data as the final prediction data when the calculated difference is greater than a threshold.

4. The method of claim 2, wherein determining the final prediction data comprises determining a value obtained by adding the correction data to the prediction data as the final prediction data when the calculated difference is less than or equal to a threshold.

5. The method of claim 3, wherein the threshold is based on a preset threshold and is changed based on a driving condition of the vehicle, and wherein the preset threshold is a value set based on the pre-collected test data.

6. The method of claim 4, wherein the threshold is based on a preset threshold and is changed based on a driving condition of the vehicle, and wherein the preset threshold is a value set based on the pre-collected test data.

7. The method of claim 5, wherein the test data comprises a plurality of data collected at different time points, and the preset threshold is set based on:

calculating the difference between the measured data of the wheel torque of the vehicle in the test data and the prediction data of the wheel torque of the vehicle in the test data;

generating an error distribution indicating a distribution of the difference based on values obtained by repeating the calculating of the difference for the plurality of data included in the test data; and calculating the preset threshold based on a mean and a standard deviation of the error distribution.

8. The method of claim 6, wherein the test data comprises a plurality of data collected at different time points, and the preset threshold is set based on:

calculating the difference between the measured data of the wheel torque of the vehicle in the test data and the prediction data of the wheel torque of the vehicle in the test data;

generating an error distribution indicating a distribution of the difference based on values obtained by repeating the calculating of the difference for the plurality of data included in the test data; and calculating the preset threshold based on a mean and a standard deviation of the error distribution.

9. The method of claim 1, wherein the sensor data is data relating to one or more of a wheel angular velocity, a vehicle acceleration, and an engine torque.

10. The method of claim 1, wherein the generating of the prediction data for the wheel torque of the vehicle by using a first model comprises:

predicting a wheel torque value based on the physical equation; and updating the predicted wheel torque value based on the recursive equation.

11. An apparatus for controlling a vehicle based on wheel torque prediction, the apparatus comprising:

at least one memory for storing instructions; and at least one processor, wherein the at least one processor is configured to execute the instructions to perform processes of:

collecting sensor data indicating a driving state of the vehicle;

generating prediction data for wheel torque of the vehicle based on the sensor data using a first model, wherein the first model is based on a physical equation and a recursive equation;

generating correction data for the wheel torque of the vehicle based on the sensor data using a second model, wherein the second model is a machine learning model;

determining final prediction data for the wheel torque of the vehicle based on one or more of the prediction data and the correction data; and controlling the vehicle based on the final prediction data.

12. The apparatus of claim 11, wherein the processor further performs a process of calculating a difference between the prediction data and measured data of the wheel torque of the vehicle in pre-collected test data, and wherein the determining of the final prediction data comprises one of, based on the calculated difference, (a) determining the correction data as the final prediction data; or (b) determining a value obtained by adding the correction data to the prediction data as the final prediction data.

13. The apparatus of claim 12, wherein determining the final prediction data comprises determining the correction data as the final prediction data when the calculated difference is greater than a threshold.

14. The apparatus of claim 12, wherein determining the final prediction data comprises determining a value obtained by adding the correction data to the prediction data as the final prediction data when the calculated difference is less than or equal to a threshold.

15. The apparatus of claim 13, wherein the threshold is based on a preset threshold and is changed based on a driving condition of the vehicle, and wherein the preset threshold is a value set based on the pre-collected test data.

16. The apparatus of claim 14, wherein the threshold is based on a preset threshold and is changed based on a driving condition of the vehicle, and wherein the preset threshold is a value set based on the pre-collected test data.

17. The apparatus of claim 15, wherein the test data comprises a plurality of data collected at different time points, and the preset threshold is set based on:

calculating the difference between the measured data of the wheel torque of the vehicle in the test data and the prediction data of the wheel torque of the vehicle in the test data;

generating an error distribution indicating a distribution of the difference based on values obtained by repeating the calculating of the difference for the plurality of data included in the test data; and calculating the preset threshold based on a mean and a standard deviation of the error distribution.

18. The apparatus of claim 16, wherein the test data comprises a plurality of data collected at different time points, and the preset threshold is set based on:

calculating the difference between the measured data of the wheel torque of the vehicle in the test data and the prediction data of the wheel torque of the vehicle in the test data;

generating an error distribution indicating a distribution of the difference based on values obtained by repeating the calculating of the difference for the plurality of data included in the test data; and calculating the preset threshold based on a mean and a standard deviation of the error distribution.

19. The apparatus of claim 11, wherein the sensor data comprises one or more of wheel angular velocity, vehicle acceleration, and engine torque.

20. The apparatus of claim 11, wherein the generating of the prediction data on the wheel torque of the vehicle by using a first model comprises:

predicting a wheel torque value based on the physical equation; and updating the predicted wheel torque value based on the recursive equation.

* * * * *